United States Patent [19]

Chang et al.

[11] Patent Number: 5,401,478
[45] Date of Patent: Mar. 28, 1995

[54] SELECTIVE CATALYTIC REDUCTION OF NITROGEN OXIDES

[75] Inventors: Clarence D. Chang, Princeton, N.J.; José G. Santiesteban, Yardley, Pa.; David S. Shihabi, Pennington, N.J.; Scott A. Stevenson, Newtown, Pa.

[73] Assignee: Mobil Oil Corp., Fairfax, Va.

[21] Appl. No.: 100,940

[22] Filed: Aug. 3, 1993

[51] Int. Cl.$^6$ .............................. C01B 21/20
[52] U.S. Cl. ..................... 423/235; 423/237; 423/239.1; 423/239.2
[58] Field of Search .............. 423/235, 235 D, 236, 423/237, 239.1, 239.2

[56] References Cited

U.S. PATENT DOCUMENTS

| | | | |
|---|---|---|---|
| 4,081,510 | 3/1978 | Kato et al. | 423/237 |
| 4,789,531 | 12/1988 | Eichholtz et al. | 423/235 |
| 4,792,439 | 12/1988 | Schneider et al. | 423/239 |
| 4,812,430 | 3/1989 | Child | 502/42 |
| 4,918,041 | 4/1990 | Hollstein et al. | 502/217 |
| 5,113,034 | 5/1992 | Soled et al. | 585/510 |
| 5,143,707 | 9/1992 | Beck et al. | 423/239 |

FOREIGN PATENT DOCUMENTS

| | | | |
|---|---|---|---|
| 027765 | 8/1988 | European Pat. Off. | 423/237 |
| 0516262 | 12/1992 | European Pat. Off. | 423/239.2 |
| 3632720 | 4/1988 | Germany . | |
| 63-143941 | 6/1988 | Japan | 423/239.1 |
| 1288339 | 11/1989 | Japan . | |

OTHER PUBLICATIONS

"Chemical Dictionary" by Grant and Hachh (5th ed.) 1987 pp. 606 and 640; McGraw-Hill Book Co.

Hino et al., "Synthesis of Solid Super acid of Tungsten Oxide Supported on Zirconia and its Catalytic Action for Reactions of Butane and Pentane," J. Chem. Soc., Chem. Commun., 1259-1260 (1988).

Proceedings 9th Intern. Congress on Catalysis, vol. 4, Oxide Catalysts and Catalyst Development, M. J. Phillips et al., ed., 1727-1734 (1988).

*Primary Examiner*—Gary P. Straub
*Assistant Examiner*—Timothy C. Vanoy
*Attorney, Agent, or Firm*—Alexander J. McKillop; Dennis P. Santini; Edward F. Kenehan, Jr.

[57] ABSTRACT

There is provided a catalytic method for converting nitrogen oxides to nitrogen (i.e., $N_2$). The catalyst for this method comprises an acidic solid component comprising a Group IVB metal oxide modified with an oxyanion of a Group VIB metal. An example of this catalyst is zirconia, modified with tungstate. This method may be used for reducing emissions of nitrogen oxides from waste gases, including industrial exhaust gases and automobile exhaust gases. In a particular embodiment, nitrogen oxides in waste gases may be reacted with ammonia before the waste gases are discharged to the atmosphere.

8 Claims, No Drawings

SELECTIVE CATALYTIC REDUCTION OF NITROGEN OXIDES

BACKGROUND

There is provided a catalytic method for converting nitrogen oxides to nitrogen (i.e., $N_2$). The catalyst for this method comprises an acidic solid comprising a Group IVB metal oxide modified with an oxyanion of a Group VIB metal. This method may be used for reducing emissions of nitrogen oxides from waste gases, including industrial exhaust gases and automobile exhaust gases. In a particular embodiment, nitrogen oxides in waste gases may be reacted with ammonia before the waste gases are discharged to the atmosphere.

A number of oxides of nitrogen are known which are relatively stable at ambient conditions and two of these, nitric oxide (NO) and nitrogen dioxide ($NO_2$) are principal contributors to atmospheric pollution. In this specification, they are referred to generically as $NO_x$ for convenience. They are usually formed in internal combustion engines as well as in furnaces, boilers, and incinerators in which high temperature combustion processes occur. Although the concentrations of $NO_x$ in the exhaust gases of these combustion processes are relatively low, the aggregate amounts discharged into the atmosphere may be sufficient to cause significant pollution problems. Reduction of $NO_x$ emissions is therefore an objective in the control of industrial and automotive pollution.

Various reducing agents such as ammonia, carbon monoxide, hydrogen, and hydrocarbons may be used to convert $NO_x$ to molecular nitrogen ($N_2$) in the presence of suitable catalysts. A number of metals and metal oxides are known to be catalytically active for the reaction, including platinum, rhodium, vanadium oxide, tungsten, and titanium oxide. See Bosch, H., et al., "Catalytic Reduction of Nitrogen Oxides-A Review of the Fundamentals of Technology," *Catalysis Today*, vol. 2, no. 4, 369–531 (1988). The metal component is conventionally supported on a porous carrier such as silica, alumina, zirconia, or a zeolite such as ZSM-5. See Groeneveld, M.J., et al., "Preparation, Characterization and Testing of New V/Ti/SiO$_2$ Catalysts for Denoxing and Evaluation of Shell Catalyst S-995," *Catalysis: Theory to Practice, Proceedings of the 9th International Congress on Catalysis*, vol. 4, 1743–1749 (1988). A number of $NO_x$ reduction processes are referred to in U.S. Pat. No. 4,929,586 (Hegedus). U.S. Pat. No. 4,778,665 (Krishnamurthy) discloses a selective catalytic reduction process using a catalyst comprising an intermediate pore size zeolite.

SUMMARY

There is provided a method for converting nitrogen oxides to nitrogen by contacting the nitrogen oxides with a reducing agent in the presence of a catalyst which is effective for the reduction of nitrogen oxides, said catalyst comprising an acidic solid comprising a Group IVB metal oxide modified with an oxyanion of a Group VIB metal.

There is also provided a method for pretreating prior to discharge to the atmosphere an exhaust gas contaminated with $NO_x$, which method comprises forming at a temperature of at least about 200° C. a mixture of ammonia and the exhaust gas in which the ammonia is present in an amount sufficient to effect reduction of $NO_x$ by reaction with the ammonia, and contacting the mixture at a temperature from about 200° C. to about 600° C. and at a gas hourly space velocity effective to reduce the $NO_x$ content with a selective reduction catalyst comprising an acidic solid comprising a Group IVB metal oxide modified with an oxyanion of a Group VIB metal.

EMBODIMENTS

The catalyst described herein comprises an oxide of a Group IVB metal, preferably zirconia or titania. This Group IVB metal oxide is modified with an oxyanion of a Group VIB metal, such as an oxyanion of tungsten, such as tungstate. The modification of the Group IVB metal oxide with the oxyanion of the Group VIB metal imparts acid functionality to the material. The modification of a Group IVB metal oxide, particularly, zirconia, with a Group VIB metal oxyanion, particularly tungstate, is described in U.S. Pat. No. 5,113,034; in Japanese Kokai Patent Application No. Hei 1 [1989]-288339; and in an article by K. Arata and M. Hino in *Proceedings 9th International Congress on Catalysis*, Volume 4, pages 1727–1735 (1988), the entire disclosures of these publications are expressly incorporated herein by reference.

According to an optional modification of the Group IVB metal oxide described herein, a hydrogenation/dehydrogenation component is combined with the Group IV metal oxide. This hydrogenation/dehydrogenation component imparts the ability of the material to catalyze the addition of hydrogen to or the removal of hydrogen from organic compounds, such as hydrocarbons, optionally substituted with one or more heteroatoms, such as oxygen, nitrogen, metals or sulfur, when the organic compounds are contacted with the modified material under sufficient hydrogenation or dehydrogenation conditions.

Examples of hydrogenation/dehydrogenation components include the oxide, hydroxide or free metal (i.e., zero valent) forms of Group VIII metals (i.e., Pt, Pd, Ir, Rh, Os, Ru, Ni, Co and Fe), Group IVA metals (i.e., Sn and Pb), Group VB metals (i.e., Sb and Bi) and Group VIIB metals (i.e., Mn, Tc and Re). The present catalyst may comprise one or more catalytic forms of one or more noble metals (i.e., Pt, Pd, Ir, Rh, Os or Ru). Combinations of catalytic forms of such noble or non-noble metals, such combinations of Pt with Sn, may be used. The valence state of the metal of the hydrogenation/dehydrogenation component is preferably in a reduced valance state, e.g., when this component is in the form of an oxide or hydroxide. The reduced valence state of this metal may be attained, in situ, during the course of a reaction, when a reducing agent, such as hydrogen, is included in the feed to the reaction.

For the purposes of the present disclosure, the expression, Group IVB metal oxide modified with an oxyanion of a Group VIB metal, is intended to connote a material comprising, by elemental analysis, a Group IVB metal, a Group VIB metal and oxygen, with more acidity than a simple mixture of separately formed Group IVB metal oxide mixed with a separately formed Group VIB metal oxide or oxyanion. The present Group IVB metal, e.g., zirconium, oxide modified with an oxyanion of a Group VIB metal, e.g., tungsten, is believed to result from an actual chemical interaction between a source of a Group IVB metal oxide and a source of a Group VIB metal oxide or oxyanion.

This chemical interaction is discussed in the aforementioned article by K. Arata and M. Hino in *Proceed-*

*ings 9th International Congress on Catalysis,* Volume 4, pages 1727–1735 (1988). In this article, it is suggested that solid superacids are formed when sulfates are reacted with hydroxides or oxides of certain metals, e.g., Zr. These superacids are said to have the structure of a bidentate sulfate ion coordinated to the metal, e.g., Zr. In this article, it is further suggested that a superacid can also be formed when tungstates are reacted with hydroxides or oxides of Zr. The resulting tungstate modified zirconia materials are theorized to have an analogous structure to the aforementioned superacids comprising sulfate and zirconium, wherein tungsten atoms replace sulfur atoms in the bidentate structure.

Although it is believed that the present catalysts may comprise the bidentate structure suggested in the aforementioned article by Arata and Hino, the particular structure of the catalytically active site in the present Group IVB metal oxide modified with an oxyanion of a Group VIB metal has not yet been confirmed, and it is not intended that this catalyst component should be limited to any particular structure.

Other elements, such as alkali (Group IA) or alkaline earth (Group IIA) compounds may optionally be added to the present catalyst to alter catalytic properties. The addition of such alkali or alkaline earth compounds to the present catalyst may enhance the catalytic properties of components thereof, e.g., Pt or W, in terms of their ability to function as a hydrogenation/dehydrogenation component or an acid component.

The Group IVB metal (i.e., Ti, Zr or Hf) and the Group VIB metal (i.e., Cr, Mo or W) species of the present catalyst are not limited to any particular valence state for these species. These species may be present in this catalyst in any possible positive oxidation value for these species. Subjecting the catalyst, e.g., when the catalyst comprises tungsten, to reducing conditions, e.g., believed to be sufficient to reduce the valence state of the tungsten, may enhance the overall catalytic ability of the catalyst to catalyze certain reactions, e.g., the isomerization of n-hexane.

Suitable sources of the Group IVB metal oxide, used for preparing the present catalyst, include compounds capable of generating such oxides, such as oxychlorides, chlorides, nitrates, etc., particularly of zirconium or titanium. Alkoxides of such metals may also be used as precursors or sources of the Group IVB metal oxide. Examples of such alkoxides include zirconium n-propoxide and titanium i-propoxide. Preferred sources of a Group IVB metal oxide are zirconium hydroxide, i.e., $Zr(OH)_4$, and hydrated zirconia. The expression, hydrated zirconia, is intended to connote materials comprising zirconium atoms covalently linked to other zirconium atoms via bridging oxygen atoms, i.e., Zr-O-Zr, further comprising available surface hydroxy groups. These available surface hydroxyl groups are believed to react with the source of an anion of a Group IVB metal, such as tungsten, to form the present acidic catalyst component. As suggested in the aformentioned article by K. Arata and M. Hino in *Proceedings 9th International Congress on Catalysis,* Volume 4, pages 1727–1735 (1988), precalcination of $Zr(OH)_4$ at a temperature of from about 100° C. to about 400° C. results in a species which interacts more favorably with tungstate. This precalcination is believed to result in the condensation of ZrOH groups to form a polymeric zirconia species with surface hydroxyl groups. This polymeric species is referred to herein as a form of a hydrated zirconia.

Treatment of hydrated zirconia with a base solution prior to contact with a source of tungstate may be preferable. More particularly, refluxing hydrated zirconia in an $NH_4OH$ solution having a pH of greater than 7, e.g., about 9, may be beneficial. Without wishing to be bound by any theory, it is theorized that the base-treated, hydrated zirconia is better because it has higher surface area. It is also theoretically possible that the base treatment alters surface hydroxyl groups on the hydrated zirconia, possibly in a manner which promotes a more desirable interaction with the source of tungstate later used.

Suitable sources for the oxyanion of the Group VIB metal, preferably molybdenum or tungsten, include, but are not limited to, ammonium metatungstate or metamolybdate, tungsten or molybdenum chloride, tungsten or molybdenum carbonyl, tungstic or molybdic acid and sodium tungstate or molybdate.

The present catalyst may be prepared, for example, by impregnating the hydroxide or oxide, particularly the hydrated oxide, of the Group IVB metal with an aqueous solution containing an anion of the Group VIB metal, preferably tungstate or molybdate, followed by drying. Calcination of the resulting material may be carried out, preferably in an oxidizing atmosphere, at temperatures from about 500° C. to about 900° C., preferably from about 700° C. to about 850° C., and more preferably from about 750° C. to about 825° C. The calcination time may be up to 48 hours, preferably for about 0.5–24 hours, and more preferably for about 1.0–10 hours. In a most preferred embodiment, calcination is carried out at about 800° C. for about 1 to about 3 hours.

When a source of the hydroxide or hydrated oxide of zirconium is used, calcination, e.g., at temperatures greater than 500° C., of the combination of this material with a source of an oxyanion of tungsten may be needed to induce the theorized chemical reaction which imparts the desired degree of acidity to the overall material. However, when more reactive sources of zirconia are used, it is possible that such high calcination temperature may not be needed.

In the present catalyst, of the Group IVB oxides, zirconium oxide is preferred; and of the Group VIB anions, tungstate is preferred.

Qualitatively speaking, elemental analysis of the present catalyst will reveal the presence of Group IVB metal, Group VIB metal and oxygen. The amount of oxygen measured in such an analysis will depend on a number of factors, such as the valence state of the Group IVB and Group VIB metals, the form of the hydrogenation/dehydrogenation component, moisture content, etc. Accordingly, in characterizing the composition of the present catalyst, it is best not to be restricted by any particular quantities of oxygen. In functional terms, the amount of Group VIB oxyanion in the present catalyst may be expressed as that amount which increases the acidity of the Group IVB oxide. This amount is referred to herein as an acidity increasing amount. Elemental analysis of the present catalyst may be used to determine the relative amounts of Group IVB metal and Group VIB metal in the catalyst. From these amounts, mole ratios in the form of $XO_2/YO_3$ may be calculated, where X is said Group IVB metal, assumed to be in the form $XO_2$, and Y is said Group VIB metal, assumed to be in the form of $YO_3$. It will be appreciated, however, that these forms of oxides, i.e., $XO_2$ and $YO_3$, may not actually exist, and are referred to herein simply for the purposes of calculating relative quantities of X and Y in the present catalyst. The present catalysts may have calculated mole ratios, expressed in the form of $XO_2/YO_3$, where X is at least one Group IVB metal (i.e., Ti, Zr, and Hf) and Y is at least one Group VIB metal (i.e., Cr, Mo, or W), of up to 1000, e.g., up to 300, e.g., from 2 to 100, e.g., from 4 to 30.

The present catalyst may comprise, for example, from about 0.001 to about 5 wt %, e.g., from about 0.1 to about 2 wt %, of the optional hydrogenation/dehydrogenation component, especially when this component is a noble metal.

The catalyst described herein may be used to convert nitrogen oxides to nitrogen. This reaction is carried out with a reducing agent such as but not limited to ammonia, carbon monoxide, urea, hydrocarbons, hydrogen cyanide, or hydrogen, but ammonia is preferred, and the process is described below with reference to the use of ammonia as the reducing agent for convenience and brevity. The process is, however, applicable to other gaseous reducing agents with appropriate changes in the stoichiometry. The reaction is typically carried out at a temperature above about 200° C. at ambient pressures.

The gases containing the nitrogen oxides ($NO_x$) arise from various combustion processes in which high temperatures occur. Industrial boilers, furnaces, incinerators all contribute to $NO_x$ emissions, and in general fuel-rich combustion processes produce exhaust gases with lower concentrations of $NO_x$ than do lean mixtures. The necessity to achieve combustion which is efficient in terms of fuel consumption, however, favors the use of stoichiometric or near-stoichiometric fuel/air ratios which therefore tend to promote $NO_x$ formation. The trend of many current processes is, therefore, towards greater $NO_x$ emissions. Emissions may also arise from the general nature of the process as, for example, in the regeneration of fluid catalytic cracking (FCC) catalysts where high temperatures frequently result the combustion of coke and/or carbon monoxide (CO). A representative exhaust gas composition from the regenerator of an FCCU is as follows.

| Constituent | |
|---|---|
| | Wt. % |
| $CO_2$ | 12 |
| $O_2$ | 2 |
| $H_2O$ | 15 |
| $N_2$ | 71 |
| | u ppm (v/v) |
| $SO_2$ | 410 |
| $SO_3$ | 70 |
| $NO_x$ | 200 |
| CO | 1500 |

Chemical processes are also productive of $NO_x$ emissions including, for example, the manufacture of nitric acid, nitration of organic chemicals, the calcination of solid metal nitrate salts to form oxides, as well as other chemical operations such as the reprocessing of spent nuclear fuel rods by the solution in the nitric acid to form uranyl nitrate which is then calcined to convert the nitrate to uranium oxide. The present process is effective for the removal of nitrogen oxides regardless of their origin.

Taking ammonia, the preferred species, as an example, the reduction of $NO_x$ in the absence of oxygen can be postulated to take place approximately according to the stoichiometry defined by Equations (1) and (2) below.

$$6NO_2 + 8NH_3 \rightarrow 7N_2 + 12H_2O \quad (1)$$

$$6NO + 4NH_3 \rightarrow 5N_2 + 6H_2O \quad (2)$$

In the presence of oxygen, the approximate stoichiometry is similarly $$2NO_2 + 4NH_3 + O_2 \rightarrow 3N_2 + 6H_2O \quad (3)$$

$$4NO + 4NH_3 + O_2 \Delta 4N_2 + 6H_2O \quad (4)$$

In the operation of the present process, the stoichiometry dictated by the above equations need not be followed although, of course, the amount of reducing agent present should be sufficient to effect the desired reduction in the nitrogen oxides which are present in the gases being treated. This amount will vary, of course, on the nature of the reducing agent, the composition of the gases being treated ($NO:NO_x$ ratio), and, as indicated above for the case of ammonia, whether oxygen is present. In any event, the ratio of reducing agent to the nitrogen oxides for the desired degree of reduction is preferably determined empirically, taking into account the factors set out above including the approximate stoichiometry, since the mechanism and reaction paths for $NO_x$ reduction are not known exactly.

Contact between the $NO_x$ and the reducing agent in the presence of the selected catalyst may be conducted at a temperature of 200° C. to about 600° C., and preferably at about 250° C. to about 550° C. and at a gas hourly space velocity (vols. of gas at STP per volume of catalyst per hour) adjusted to provide the desired conversion. The GHSV can be from about 1000 to 100,000 $hr^{-1}$, and preferably from 10,000 to about 50,000 $hr^{-1}$. In general, since the reaction is exothermic but low concentrations of $NO_x$ are present, adequate temperature control is readily achieved with a simple stationary, fixed bed of catalyst. However, other contacting techniques may be used such as with a fixed fluid bed, a transport bed, and a monolithic catalyst structure such as a honeycomb. The process is operable at subatmospheric to superatmospheric pressure, e.g., at 5 to 500 psia, and preferably at 10 to 50 psia, i.e., near atmospheric pressure.

It may be desirable to incorporate the present catalyst with another material to improve its properties. Such materials include active and inactive materials and synthetic or naturally occurring zeolites as well as inorganic materials such as clays, silica, and/or metal oxides. The latter may be either naturally occurring or in the form of gelatinous precipitates, sols, or gels including mixtures of silica and metal oxides.

It is noted that the present catalyst need not contain any sulfate ion (U.S. Pat. No. 4,918,041), and therefore is expected to be more stable and also to be much easier to regenerate than sulfated catalysts.

The present catalyst can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the catalyst can be extruded before drying or partially dried and then extruded. The present catalyst may be composited with a matrix material to form the finished form of the catalyst and for this purpose conventional matrix materials such as alumina, silica-alumina and silica are suitable with preference given to silica as a non-acidic binder. Other binder materials may be used, for example, titania, zirconia and other metal oxides or clays. The active catalyst may be composited with the matrix in amounts from 80:20 to 20:80 by weight, e.g., from 80:20 to 50:50 active catalyst:matrix. Compositing may be done by conventional means including mulling the materials together followed by extrusion of pelletizing into the desired finished catalyst particles.

Example 1

This Example describes the preparation of a tungstate modified zirconia catalyst. One part by weight of zirconyl chloride, $ZrOCl_2 \cdot 8H_2O$, was added to 3 parts by weight of a 10 M $NH_4OH$ solution. The resulting slurry, $Zr(OH)_4$, was pulverized for thirty minutes, filtered, and washed with 5 parts of distilled deionized water, then air dried at 140° C. for 8 hours. Approximately 7.5 parts by weight of the resulting $Zr(OH)_4$ were impregnated via incipient wetness with 2.2 parts of an aqueous solution containing 1 part of ammonium metatungstate, $(NH_4)_6H_2W_{12}O_{40}$. The resulting material was dried for 2 hours at 120° C. and then calcined at 800° C. in flowing air for 2 hours. The sample was calcined at 500° C. for 1 hour under flowing nitrogen prior to catalytic testing. This sample had a calculated mole ratio of $ZrO_2/WO_3$ of 11.6.

Example 2

This Example describes the reduction of NO using the catalyst of Example 1. A gas stream containing 200 ppm NO, 120 ppm $NH_3$, 0.1 or 1% $O_2$, and 3% $H_2O$ in balance argon was passed over a fixed bed of the tungsten/zirconia catalyst of Example 1 at a space velocity of 46,000 hr$^{-1}$. Results are summarized in Table 1.

TABLE 1

Conversion of NO and $NH_3$ Over Tungsten/Zirconia Catalyst

| Inlet Oxygen, % | Temp, °C. | Outlet Concentrations, ppm | | | Net NO Conv. (%) | % N → $N_2$ |
|---|---|---|---|---|---|---|
| | | NO | $NH_3$ | $N_2O$ | | |
| 0.1 | 300 | 195 | 116 | 0.1 | 2 | 2 |
| 0.1 | 350 | 188 | 113 | 0.2 | 6 | 5 |
| 0.1 | 400 | 176 | 100 | 0.3 | 12 | 13 |
| 0.1 | 500 | 127 | 33 | 0.4 | 37 | 50 |
| 1.0 | 300 | 187 | 99 | 0.1 | 6 | 10 |
| 1.0 | 350 | 159 | 72 | 0.2 | 20 | 27 |

TABLE 1-continued

Conversion of NO and $NH_3$ Over Tungsten/Zirconia Catalyst

| Inlet Oxygen, % | Temp, °C. | Outlet Concentrations, ppm | | | Net NO Conv. (%) | % N → $N_2$ |
|---|---|---|---|---|---|---|
| | | NO | $NH_3$ | $N_2O$ | | |
| 1.0 | 400 | 138 | 19 | 0.6 | 31 | 50 |
| 1.0 | 500 | 206 | 0 | 0.8 | −3 | 35 |

These results show that this catalyst is active for the reduction of NO by $NH_3$. Very little of the unwanted side product $N_2O$ is formed. However, in addition to the desired reduction of NO by $NH_3$, the undesired oxidation of $NH_3$ to NO is also observed. It is expected that this oxidation can be minimized either by catalyst modification or by changes in process conditions. Table 1 shows the data collected over this catalyst in the temperature range of 300° to 500° C.

What is claimed is:

1. A method for converting nitrogen oxides to nitrogen by contacting the nitrogen oxides with ammonia in the presence of a catalyst which is effective for the reduction of nitrogen oxides, said catalyst comprising an acidic solid component consisting essentially of zirconia modified with tungstate.

2. A method according to claim 1 in which the catalyst comprises the acidic solid component and a binder selected from alumina, silica, or silica-alumina.

3. A method according to claim 1 in which the nitrogen oxides are reduced with the reducing agent at temperature of at least 200° C.

4. A method according to claim 3 in which the nitrogen oxides are reduced with the reducing agent a a temperature from about 300° to 500° C.

5. A method according to claim 1 in which the reduction is carried out in the presence of oxygen.

6. A method according to claim 1 in which the reduction is carried out in the absence of oxygen.

7. A method according to claim 1 in which the nitrogen oxides are formed by the regeneration of a coked fluid catalytic cracking catalyst used in the catalytic cracking of a petroleum fraction.

8. A method for pretreating prior to discharge to the atmosphere as exhaust gas contaminated with $NO_x$, which method comprises forming at a temperature of at least about 200° C. a mixture of ammonia and the exhaust gas in which the ammonia is present in an amount sufficient to effect reduction of $NO_x$ by reaction with ammonia, and contacting the mixture at a temperature from about 200° C. to about 600° C. and at a gas hourly space velocity effective to reduce the $NO_x$ content with a selective reduction catalyst comprising an acidic solid consisting essentially of zirconia modified with tungstate.

* * * * *

UNITED STATES PATENT AND TRADEMARK OFFICE
CERTIFICATE OF CORRECTION

PATENT NO. : 5,401,478

DATED : March 28, 1995

INVENTOR(S) : C.D. Chang et al.

It is certified that error appears in the above-identified patent and that said Letters Patent is hereby corrected as shown below:

Col. 8, claim 8, line 43, "as" should be --an--.

Signed and Sealed this

First Day of August, 1995

Attest:

BRUCE LEHMAN

*Attesting Officer*   *Commissioner of Patents and Trademarks*